H. V. SOUDERS.
AUTOMOBILE SAFETY DEVICE.
APPLICATION FILED JUNE 17, 1915.
1,183,689.
Patented May 16, 1916.
3 SHEETS—SHEET 1.
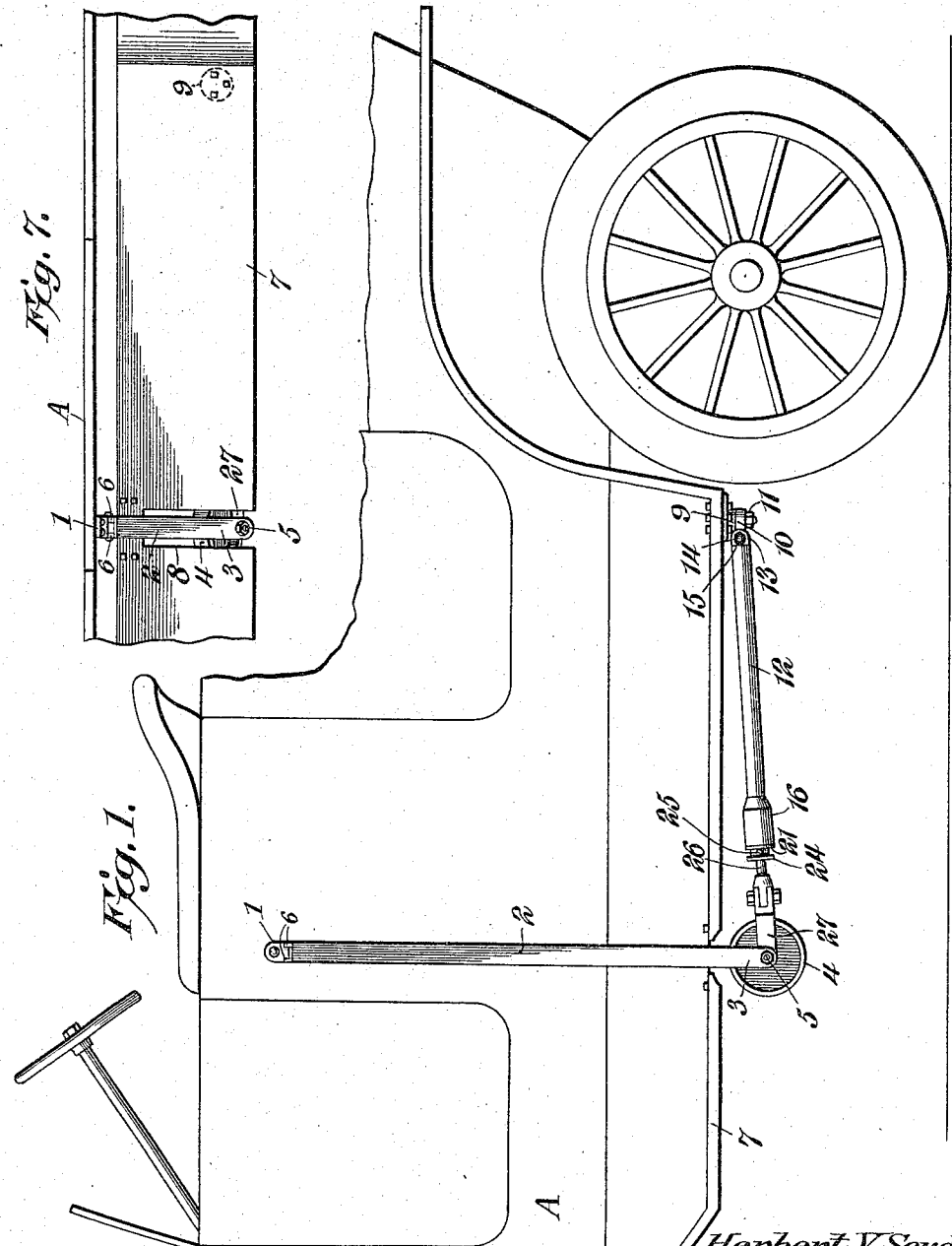
WITNESSES:
Howard D. Orr.
Walt. F. Estabrook
Herbert V. Souders,
INVENTOR,
BY E. G. Siggers
Attorney.

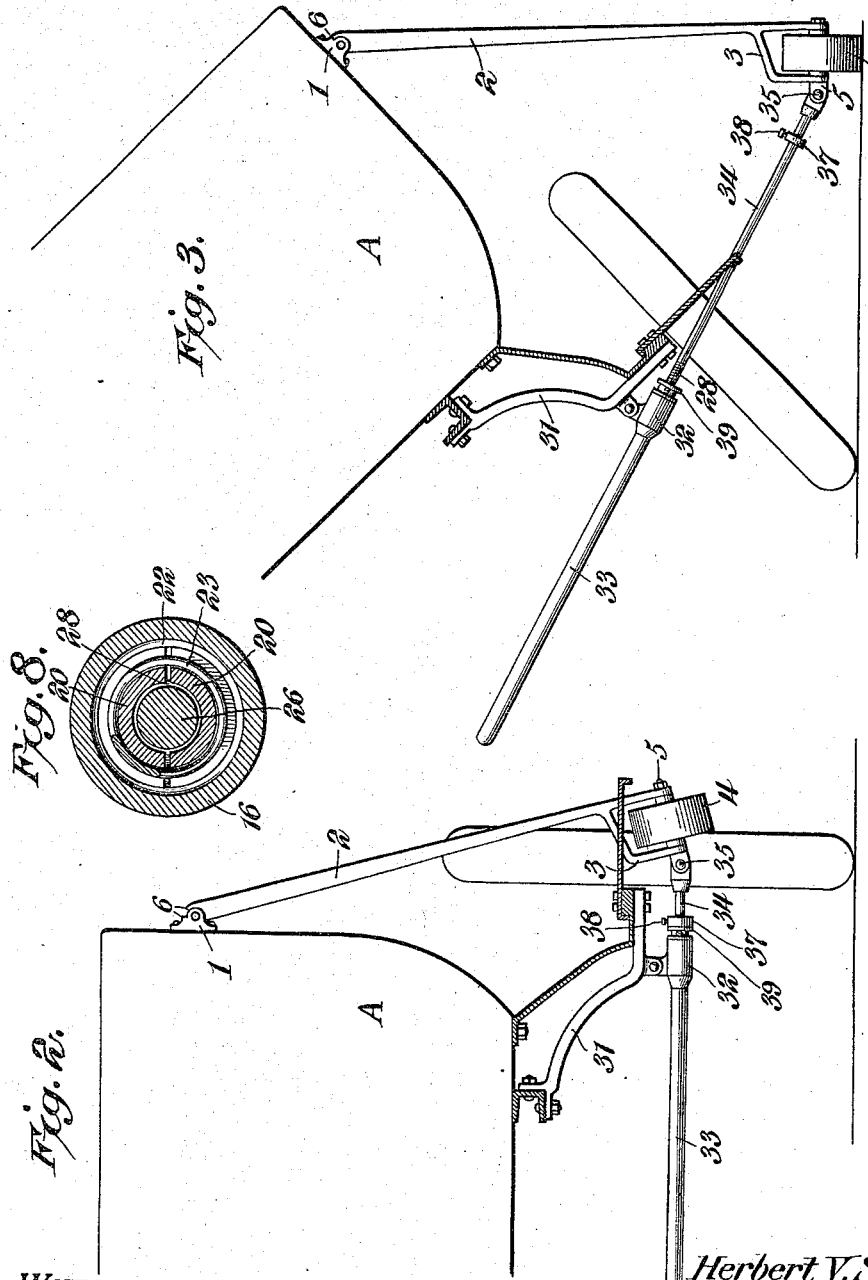

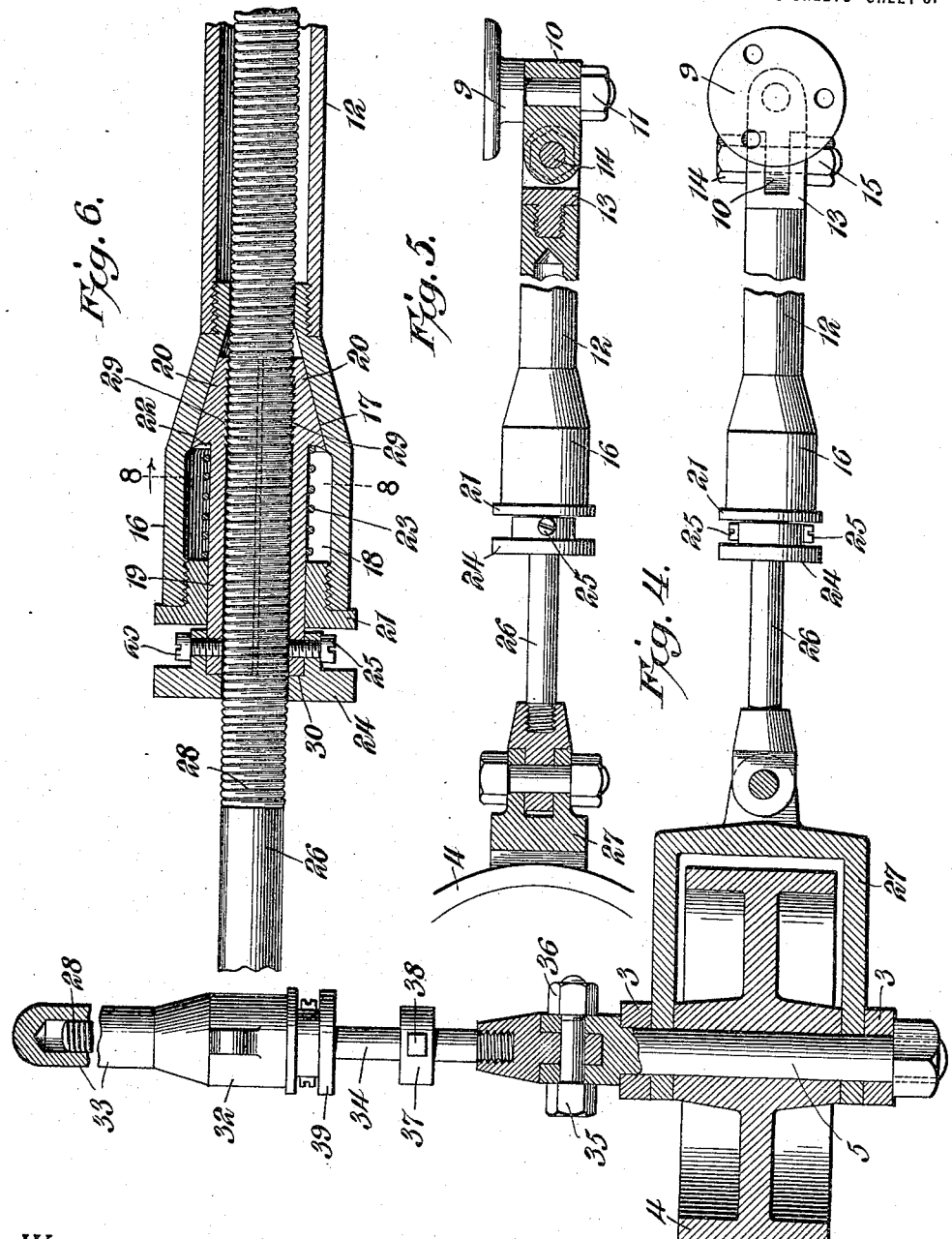

UNITED STATES PATENT OFFICE.

HERBERT VANCE SOUDERS, OF TAFT, CALIFORNIA.

AUTOMOBILE SAFETY DEVICE.

1,183,689.  Specification of Letters Patent.  Patented May 16, 1916.

Application filed June 17, 1915. Serial No. 34,672.

*To all whom it may concern:*

Be it known that I, HERBERT V. SOUDERS, a citizen of the United States, residing at Taft, in the county of Kern and State of California, have invented a new and useful Automobile Safety Device, of which the following is a specification.

This invention relates to an improvement in automobile safety devices, and the object is to provide means which will automatically swing outwardly as the vehicle is tilted, or in the act of turning over, and come in contact with the road surface or earth to prevent the vehicle from turning over and cause it to again assume its upright position.

The invention consists of a wheel which is suspended from the side of a vehicle, and adapted to be swung outwardly at an angle from the side of the vehicle to engage an obstruction or the road surface for righting the vehicle which is in the act of turning over.

Connected to the wheel is a rod, which is engaged by suitable means for maintaining the said wheel in its outermost position so that it will be held sufficiently rigid to sustain the strain and load placed upon it in the careening of the vehicle.

The invention consists of certain novel features of construction and combinations of parts which will be hereinafter described and pointed out in the claims.

It is evident that many slight changes may be made in the form and arrangement of the several parts described, without departing from the spirit and scope of the invention, and hence I do not wish to limit myself to the exact construction herein set forth.

In the accompanying drawings, Figure 1 is a view in elevation showing the invention applied to the side of an automobile. Fig. 2 is a rear view showing the application of the invention to an automobile. Fig. 3 is a view in rear elevation showing the position assumed by the device in the careening of the vehicle. Fig. 4 is a top plan view of a portion of the device and showing the wheel and the yokes connected thereto in section. Fig. 5 is a view partly in side elevation and partly in vertical section of one of the guiding rods. Fig. 6 is a view in vertical section of the tubular casing and clamping housing, and showing a portion of one of the guiding rods in elevation. Fig. 7 is a top plan view showing the application of the device to an automobile, and its location with respect to the running board. Fig. 8 is a cross sectional view on the line 8—8 of Fig. 6.

A represents the body of an automobile or vehicle and connected to the side thereof is a bracket 1. An arm 2 is pivotally connected to the bracket 1 and is provided with a yoke 3 at its lower terminal, in which a wheel 4 is journaled on a spindle 5, the spindle 5 being mounted in the yoke 3. The arm 2 is capable of an oscillatory movement and is limited in its movement by shoulders or stops 6 on the bracket 1, which are adapted to engage the upper terminal of the arm. The wheel 4 is located beneath the running board 7 of the vehicle, and the arm 2 is adapted to be received in an elongated slot 8 formed in the running board. Connected to the underside of the running board 7 is a hanger or stud 9 to which is pivotally connected a coupling member 10, this coupling member being held upon the stud or hanger by a nut 11. A tubular casing 12 has at its closed end a removable coupling member 13, which preferably has screw-threaded engagement therewith. This coupling member 13 is pivotally connected to the coupling member 10 by a bolt 14 and nut 15 to permit the casing to have a vertical movement. The coupling member 10 is capable of movement upon the stud or hanger 9 in a horizontal plane so that the casing 12 is capable of moving horizontally as well as vertically. Connected to the other terminal of the tubular casing 12 is a housing 16. This housing has screw threaded engagement with the casing 12 so that it can be readily separated. One terminal of the housing is preferably constricted, producing a beveled or cone shaped inner wall, as at 17. The beveled surface 17 tapers downwardly from the connection between the housing and casing 12, toward the chamber 18 of the housing. Mounted within the housing is a sleeve 19 which is provided with gripping jaws or members 20. The outer surfaces of these gripping members are preferably beveled to conform to the tapered or beveled surface 17 of the housing. A bushing 21 has screw threaded engagement with the inner wall of the chamber 18, and interposed between the bushing and the shoulder 22, formed on the gripping members 20, is a spring 23 which normally forces the jaws into engagement with the beveled surface 17 of the housing. A hollow cap or ring 24 is connected to the outer terminal of the sleeve 19, by means of set screws 25.

Slidably mounted within the housing 16 and casing 12, is a rod 26. This rod has a yoke 27 pivotally connected thereto and the yoke is journaled upon the spindle 5. The free end or terminal of the rod 26 is provided with a spiral groove 28. This groove 28 is preferably of a very slight depth, into which the teeth 29, formed on the inner surfaces of the jaws 20, are adapted to enter for engaging the rod to prevent the inward movement of the rod. The rod can be drawn out of the casing and housing, and, in fact, the teeth of the jaws and the groove of the rod are so constructed that the rod can slide easily from the housing and casing. When it is desired to force or cause the rod to be moved entirely within the housing and casing, it is generally necessary to grasp the ring or cap 24 and draw the sleeve outwardly, causing the jaws 20 to enter the chamber 18 of the housing 16 so that the teeth 29 of the jaws will be prevented from entering the groove of the rod.

The sleeve 19 is preferably made in two sections, and the two sections are held in a socket or recess 30 of the cap or ring 24 by set screws 25 which screw into the sleeve and cap. This formation of the sleeve allows the jaws 20 to be contracted and expanded. The jaws 20 are contracted when they are drawn into engagement with the beveled surface 17 of the housing 16, and any force or pressure which is brought to bear upon the rod 26, tending to force it into the housing and casing, causes the jaws 20 to be carried by the rod into engagement with the beveled surface 17 of the housing. This movement of the jaws upon the beveled surface 17 produces an engagement between the rod and jaws which prevents the inward movement of the rod into the casing and housing.

A bracket 31 of any suitable construction is connected to the frame of the automobile. A housing 32 is pivotally connected to the bracket and connected to the housing is a casing 33. A rod 34 is slidably mounted in the housing 32 and casing 33. The housing 32, casing 33 and rod 34 are constructed and operated in the same manner as the housing 16, casing 12, and rod 26, but in this instance the housing 32 is pivotally mounted on a bracket 31, and it is therefore not deemed necessary to describe these elements in detail. The rod 34 is pivotally connected to the spindle 5 by a bolt 35 and nut 36. A collar 37 is adjustably held upon the rod 34 by a set screw 38, which is adapted to come into engagement with the ring or cap 39 of the housing 32 for limiting the inward movement of the rod 34, as clearly shown in Fig. 2.

Under normal conditions the arm 2, rods 26 and 34 will assume the positions shown in Figs. 1 and 2, but, should the vehicle careen or tilt, the arm 2 and the rods 26 and 34 would automatically move outwardly, as illustrated in Fig. 3, for the purpose of bringing the wheel 4 in engagement with the road surface to cause the vehicle to return to its upright position. The spiral groove 28 of the rods 26 and 34 does not extend the full length of the rods but begins at the outer terminals of the rods 26 and 34 and extends along the rods to a point where the groove is first engaged by the teeth of the jaws 20 when the rods have been drawn outwardly and the arm 2 has been swung, so that it is practically at right angles to the road surface. When the arm 2 assumes a right angle, or is practically at a right angle to the road surface, the jaws 20 can be brought into engagement with the rod so that the teeth of the jaws will enter the groove of the rods. When the wheel 4 comes in contact with an obstruction or the road surface, and the weight of the car or vehicle is placed upon the wheel 4, due to the tilting or careening of the vehicle, the rods 34 and 26 are prevented from moving inwardly into the housing and casing by the teeth of the jaws 20 coming into engagement with the groove of the rods. The slightest movement of the rods into the casing causes the jaws to be brought into engagement with the beveled surface 17 of the housing and thereby lock the rods securely to the housing. The greater amount of pressure or weight applied to the rod causes a firmer grip of the jaws upon the rods. The shoulder or stop 6 of the bracket 1 will permit the car to tip or tilt at an angle of 45 degrees. The car at such an angle is on a balance and the smallest obstruction which comes in contact with the wheel 4 will have a tendency to right the car and cause it to return to its upright position. Any vibration or slight tilting of the car or vehicle, which would cause the rods 26 and 34 to move outwardly, will not interfere in any wise, as these rods will return to their normal positions in the casing as soon as the vehicle assumes its normal position. The jaws 20 do not grip the rods except along the grooved surface.

It is the intention to apply this device to each side of a vehicle but I have only disclosed the invention applied to one side of an automobile.

From the foregoing it will be seen that I have provided means for preventing the upsetting of vehicles which is automatic in its operation.

What is claimed is,—

1. A vehicle safety device comprising a roller suspended from the side of a vehicle, and adapted to hang close against the side, an extensible supporting arm carried by the vehicle having connection with the roller and adapted to admit the free outward swinging of the roller upon the tilting of the vehicle for engagement with a supporting surface, said supporting arm being normally non-collapsible whereby to retain the roller in its outward position to support the vehicle, and means for releasing the supporting arm to collapse the same and return the roller to normal position.

2. In a vehicle safety device, an arm hinged to a vehicle and adapted to swing laterally therefrom, a roller on the free end of the arm for contact with a supporting surface, a rod connected to the free end of the arm, a casing on the vehicle adapted to slidably receive the inner end of the rod, and a one-way clutch member in the casing for engagement with the rod whereby to admit of the extension of the rod to move the roller into working position, said clutch member being adapted to retain the rod extended to support the vehicle.

3. In a vehicle safety device, a roller, a supporting rod connected to the roller, a casing mounted on a vehicle and adapted to receive said rod therethrough, a conical housing upon the casing about said rod, a pair of clutch members in said housing, a spring engaging the clutch members to normally urge the same against the conical end of the housing whereby to contract the clutch members upon the rod and retain the same from inner movement with respect to the casing, and releasing means connected to the clutch members operable exteriorly of the housing for withdrawing said members from the conical end of the housing whereby to release the rod.

4. In a vehicle safety device, a casing adapted for positioning upon a vehicle and having a conical housing upon the end thereof, a rod slidable in the casing and through said conical housing, a pair of normally expanding clutch members mounted in the housing about said rod, a spring in the housing engaging said clutch members to force the same against the conical end of the housing whereby to contract the clutch members upon the rod, said clutch members having engaging teeth inclined outwardly whereby to admit of the free extension of the rod from the casing and to engage the rod to hold the same against inward movement, and a collar surrounding the rod exteriorly of the casing, and the housing having connection with said clutch members whereby to withdraw the same from the conical end of the housing to release the rod.

5. A safety device comprising an arm, a rod connected to said arm and being adapted to be carried by said arm in its movement, a housing through which said rod moves, and spring controlled gripping members slidably mounted in said housing being adapted to engage the rod for preventing the movement of said rod in one direction.

6. A safety device comprising an arm, a rod connected to said arm and being adapted to be carried by said arm in its movement, a housing through which said rod moves, and spring controlled gripping members slidably mounted in said housing being adapted to engage the rod for preventing the movement of said rod in one direction, said gripping members capable of being drawn out of engagement with said rod to permit the rod to have movement in either direction.

7. The combination with a vehicle body, of an arm pivotally connected to the body of the vehicle being adapted to be swung to a position upon the tilting of the vehicle body to engage an obstruction for righting the vehicle body, rods connected to the arm and being adapted to move with the arm, one of the rods pivotally connected to the vehicle body to swing in a horizontal plane and the other mounted to swing in a vertical plane, and means for preventing the return movement of said rods.

8. The combination with a vehicle body, of an arm pivotally connected to the body of the vehicle being adapted to automatically swing to a position upon the tilting of the vehicle to engage an obstruction for righting the vehicle body, sliding rods connected to the arm being adapted to be moved with the arm, one of the rods pivotally connected to the vehicle body to swing in a horizontal plane and the other rod mounted to swing in a vertical plane, and means for preventing the return sliding movement of said rods.

9. The combination with a vehicle body, of an arm pivotally connected to the body of the vehicle being adapted to automatically swing to a position upon the tilting of the vehicle to engage an obstruction for righting the vehicle body, and rods connected to the arm being adapted to move with the arm, one of the rods pivotally connected to the vehicle body to swing in a horizontal plane, and the other rod mounted to swing in a vertical plane.

10. In combination with a vehicle, an inextensible arm pivoted to the side of the vehicle to swing outwardly away therefrom in a vertical plane and carrying a roller in its outer end, and an extensible rod connected to the roller and swinging in a horizontal plane, said extensible rod being pivoted in rear of said arm, and adapted to normally lie with the roller beneath the vehicle and close to the side thereof.

11. In combination with a vehicle, an inextensible arm pivoted to the side of the vehicle to swing outwardly away therefrom and carrying a roller in its outer end, and a pair of guide rods slidably mounted in spaced relation upon the vehicle and having connection with the roller to support the same from different angles when the roller is extended.

12. In combination with a vehicle, an inextensible arm pivoted to the side of the vehicle and adapted to swing outwardly away therefrom in a vertical plane and carrying a roller in its outer end, and a pair of guiding rods slidably mounted beneath the vehicle in spaced relation to each other and having connection with the roller, said guiding rods being adapted to lie within the side of the vehicle with the roller when collapsed and adapted to follow the roller and support the same from different angles when the roller is extended.

13. In combination with a vehicle an inextensible arm pivoted to the side of the vehicle and adapted to swing laterally therefrom, an extensible rod pivoted to the vehicle in transversely spaced relation to the roller and having connection therewith, and a second extensible rod pivoted on the vehicle in longitudinally spaced relation to the roller and having connection therewith, said rods adapted to move outwardly from the side of the vehicle with the roller and to brace the same from different angles when the roller is extended.

14. In combination with a vehicle, an inextensible arm pivoted to the side of the vehicle and adapted to swing outwardly therefrom in a vertical plane and carrying a roller in its outer end, a transversely extending rod mounted on the vehicle and having connection with the roller to brace the same from inward movement toward the vehicle when the roller is extended, and a longitudinally extending rod mounted on the vehicle, and having connection with the roller to hold the same from swinging longitudinally of the vehicle when the roller is extended.

15. In combination with a vehicle, a running board on the side of the vehicle, an arm pivoted to the side of the vehicle above the running board and adapted to be extended laterally from the vehicle, a roller in the outer end of said arm, said running board having a slot therein which opens outwardly for the reception of said arm whereby the arm may hang down close against the side of the vehicle and support the roller beneath the running board, and means connected to the roller and the underside of the vehicle and normally lying beneath the vehicle to brace the arm when extended.

16. In combination with a vehicle, a running board at the side of the vehicle having a slot in its outer edge, an arm pivoted to the side of the vehicle above the running board and adapted to hang down and rest in said slot, a roller on the lower end of said arm beneath the running board, and an extensible guiding rod arranged beneath the running board and having connection with said roller adapted to swing outwardly from beneath the running board with the roller and support the same when extended.

17. In combination with a vehicle, a running board on the side of the vehicle having a slot extending inwardly from its outer edge, an arm pivoted to the side of the vehicle and normally hanging down through the slot, a roller on the lower end of the arm normally lying beneath the running board, and a rod pivoted to the vehicle having a connection with the roller to brace the same when extended, and normally lying within the outer edge of the running board.

18. In combination with a vehicle, an arm pivoted to the side of the vehicle and adapted to hang down close thereagainst, a roller in the lower end of the arm, and a rod pivoted to the vehicle in transversely spaced relation to the arm and having connection with the roller whereby the rod is extended longitudinally upon the outward swinging of the arm to support the roller when extended.

In testimony, that I claim the foregoing as my own, I have hereto affixed my signature in the presence of two witnesses.

HERBERT VANCE SOUDERS.

Witnesses:
S. A. McCarthy,
R. M. Zimmerman.